United States Patent [19]

Allen et al.

[11] 3,913,672
[45] Oct. 21, 1975

[54] METHOD FOR ESTABLISHING COMMUNICATION PATH IN VISCOUS PETROLEUM-CONTAINING FORMATIONS INCLUDING TAR SANDS FOR OIL RECOVERY OPERATIONS

[75] Inventors: Joseph Columbus Allen, Bellaire, Tex.; David Arthur Redford, Fort Saskatchewan, Canada

[73] Assignees: Texaco Inc., New York, N.Y.; Texaco Exploration Canada, Calgary, Canada

[22] Filed: Oct. 15, 1973

[21] Appl. No.: 406,421

[52] U.S. Cl. .......... 166/263; 166/271; 166/274; 166/305 R
[51] Int. Cl.$^2$ .......................... E21B 43/00
[58] Field of Search .......... 166/263, 271–274, 166/308, 303, 305 R

[56] References Cited
UNITED STATES PATENTS

| | | | |
|---|---|---|---|
| 2,897,894 | 8/1959 | Draper et al. | 166/272 |
| 3,279,538 | 10/1966 | Doscher | 166/271 |
| 3,405,761 | 10/1968 | Parker | 166/272 |
| 3,459,265 | 8/1969 | Buxton et al. | 166/263 |
| 3,465,823 | 9/1969 | Jacoby et al. | 166/263 |
| 3,480,081 | 11/1969 | Felsenthal et al. | 166/274 |
| 3,548,940 | 12/1970 | Reguera et al. | 166/273 |
| 3,780,805 | 12/1973 | Green | 166/271 |

*Primary Examiner*—Ernest R. Purser
*Assistant Examiner*—Jack E. Ebel
*Attorney, Agent, or Firm*—T. H. Whaley; C. G. Ries; Jack H. Park

[57] ABSTRACT

Many oil recovery techniques for viscous oil recovery including steam injection and in situ combustion require establishment of a high permeability fluid flow path in the formation. The method of the present invention comprises forming an initial entry zone into the formation by means such as hydraulic fracturing and propping, or utilizing high permeability streaks naturally occurring within the formation, and injecting into the propped fracture zone or high permeability streak a solvent for the petroleum contained in the formation, said solvent being saturated with a gas or containing appreciable quantities of gas dissolved therein. The solvent-gas solution is injected into the formation at a pressure up to a value equal in pounds per square inch to the overburden thickness in feet, until the formation in the exposed area has been pressurized to the desired pressure and thereafter terminating injection and producing the gas and solvent-bitumen mixture by solution gas pressure depletion. The operation may be repeated through several cycles in order to enlarge the flow channel, and in the instance of a multi-well throughput operation adjacent injection and production wells are both treated in a cyclical fashion until communication between injection wells and production wells is established. Suitable solvents include aromatic hydrocarbons such as benzene, toluene, and xylene as well as carbon disulfide. Suitable gases include carbon dioxide, methane, nitrogen and air.

27 Claims, 1 Drawing Figure

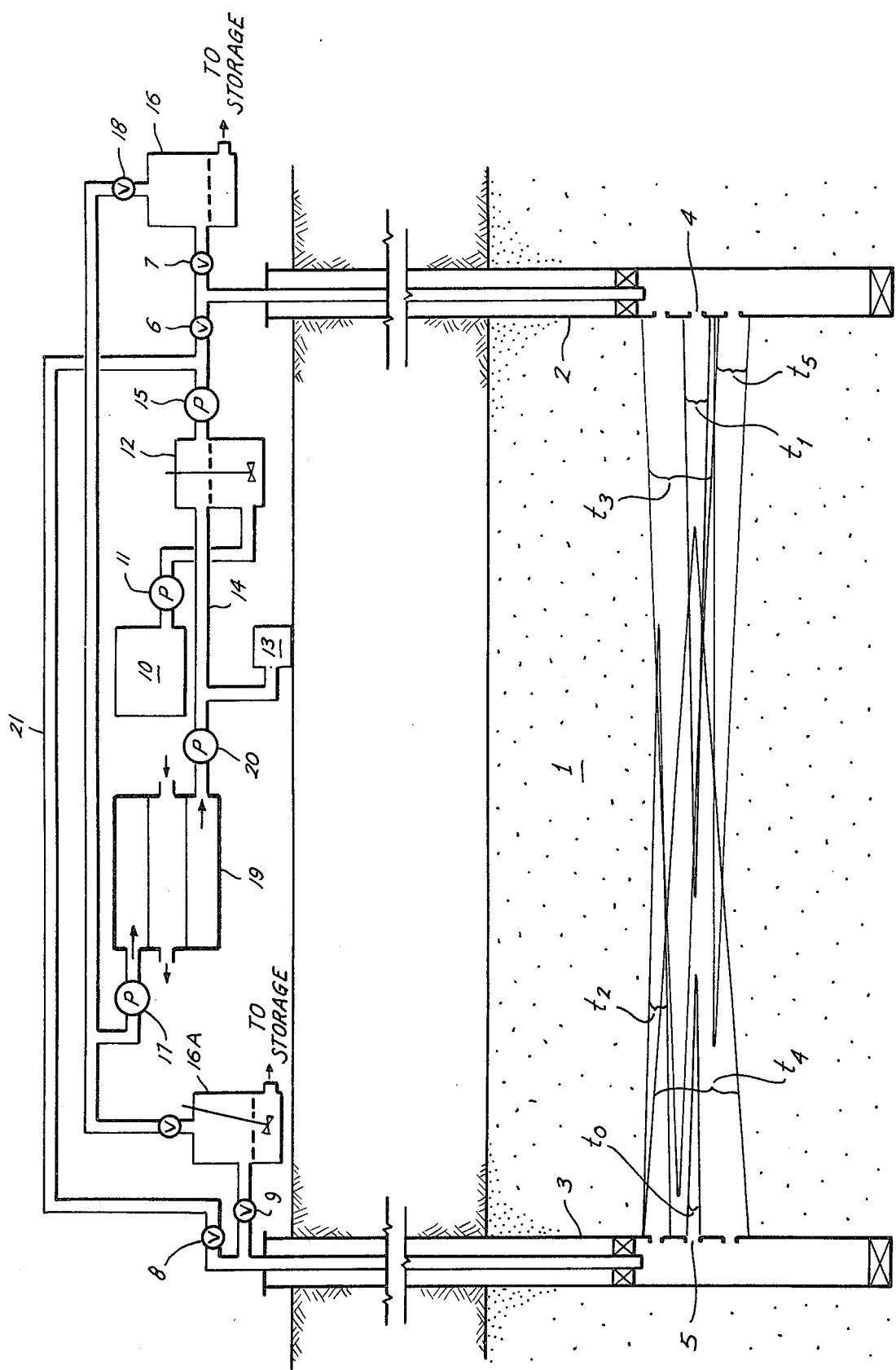

METHOD FOR ESTABLISHING COMMUNICATION PATH IN VISCOUS PETROLEUM-CONTAINING FORMATIONS INCLUDING TAR SANDS FOR OIL RECOVERY OPERATIONS

BACKGROUND OF THE INVENTION

1. Field of the Invention

This invention pertains to a method for recovering petroleum from viscous petroleum-containing formations including tar sand deposits, and more specifically to a method for establishing an interwell communication path in the formation, and to a method for using the communication path in an oil recovery process involving injection of a recovery fluid such as solvent, steam or air for in situ combustion into the communication path.

2. Description of the Prior Art

There are many subterranean, petroleum-containing formations throughout the world from which petroleum cannot be recovered by conventional means because of the high viscosity of the petroleum contained therein. The best known and most extreme example of such viscous petroleumcontaining formations are the so-called tar sands or bituminous sand deposits. The largest and most famous such deposit is in the Athabasca area in the northeastern part of the Province of Alberta, Canada, which deposit contains in excess of 700 billion barrels of petroleum. Other extensive tar sand deposits exist in the western United States and in Venezuela, and lesser deposits are in Europe and Asia.

Tar sands are defined as sand saturated with a highly viscous crude petroleum material not recoverable in its natural state through a well by ordinary production methods. The petroluem or hydrocarbon/materials contained in tar sand deposits are highly bituminous in character, and are essentially solid at formation temperature and pressure. The sand portion of the tar sand deposit contains about 35 percent by volume or 83 percent by weight sand, and the sand is generally a fine grain quartz material. The sand grains are coated with a layer of water, and the void space between the water coated sand grains is filled with bituminous petroleum. Some tar sand deposits have a gas saturation, generally air or methane, although many tar sand deposits contain essentially no gas. The sum of bitumen and water concentrations consistently equals about 17 percent by weight, with the bitumen portion thereof varying from about two percent to about 16 percent.

One of the striking differences between tar sand deposits and more conventional petroleum reservoirs is the absence of a consolidated mineral matrix; the sand particles are in contact but not cemented together. The bitumen occupies the void space around the sand grains. The API gravity of the bitumen ranges from about 6° to about 8°, and the specific gravity at 60° Fahrenheit is from about 1.006 to about 1.027. Approximately 50 percent of the bitumen is distillable without cracking, and the sulfur content varies from 4 to 5 percent by weight.

Recovery methods for tar sand deposits are classifiable as strip mining or in situ processes. Most of the recovery to date has been by means of strip mining, although strip mining is economically feasible at the present time only in those deposits wherein the ratio of overburden thickness to tar sand deposit thickness is around one or less. In situ processes which have been proposed in the prior art include thermal methods such as fire flooding and steam injection, as well as steameemulsification drive processes.

Application of in situ processes to tar sand deposits has been fairly consistently unsuccessful. The unusual characteristics of tar sand deposits responsible for the high failure rate in in situ recovery techniques to date include the extremely high viscosity of petroleum fraction, the mobility of the unconsolidated sands when the bitumen is mobilized, and the relatively low permeability of the formation to injected fluids. It has been recognized in the prior art that many of the thermal processes and the steam-emulsification drive process require the establishment of a communication path between one or more injection wells and one or more production wells, through which the fluid may be injected. Many failures to recover appreciable quantities of bitumen from tar sand deposits by in situ recovery processes are related to the failure to establish a stable, permanent communication path between injection wells and production wells. There are many techniques described in the prior art for fracturing and injecting propping agents such as coarse sand to prevent healing of the fracture. Communication paths established by fracturing techniques are not satisfactory for use in thermal recovery operations as applied to tar sand deposits. When a heated fluid such as steam is injected into a propped fracture communication path between injection and production wells, the tar sand above the communication path is heated, softens and flows down into and plugs the communication path. Furthermore, if bitumen is heated by the injection fluid and experiences a viscosity reduction as a consequence thereof, it will flow through a propped fracture zone for a brief period. The heated bitumen thereafter cools sufficiently so that it becomes immobile and quickly plugs a propped fracture zone. Only if the propped fracture zone can be expanded substantially in thickness, can fluid communication be maintained.

In view of the foregoing, it can be seen that there is a substantial, unfulfilled need for a method of establishing a stable communication path between injection wells and production wells within a tar sand deposit, which communication path will not be affected by the subsequent injection thereinto of a thermal recovery fluid.

SUMMARY OF THE INVENTION

We have discovered, and this constitutes our invention, that a stable, permeable communication path may be established between wells drilled into and completed in a subterranean, viscous petroleum-containing formation such as a tar sand deposit according to the process described below. Our process requires that there be appreciable gas permeability or a high permeability streak within the formation. The permeable streak may be a naturally occurring high permeability streak or one which is formed by means of conventional hydraulic fracturing and propping according to techniques well known in the prior art. Our process utilizes a solvent which is effective at dissolving essentially all of the hydrocarbon portion of the tar sand deposit, and a gas which is highly soluble in the solvent. Examples of solvent suitable for use in our invention include aromatic solvents such as benzene, toluene, and xylene, carbon tetrachloride, certain halogenated hydrocarbons, carbon disulfide and mixtures thereof. Gases suitable for use in our invention include carbon dioxide, methane, nitrogen, air, and mixtures thereof. Gas is dissolved in the solvent or the solvent is saturated with the gas at a pressure up to a value in pounds per square inch numerically equal to the overburden thickness in feet. The gas-saturated solvent is injected into the permeable formation or into the propped fracture or naturally occurring high permeability streak within the formation. Injection continues until that portion of the formation into which the gas saturated solvent is injected is pressurized to a preselected pressure not exceeding a value in pounds per square inch equal numerically to the overburden thickness in feet.

Once the pressure within the portion of the formation contacted by the gas saturated solvent reaches the desired value, injection is terminated and bitumen is recovered from that portion of the formation by solution gas drive, and the mixture of bitumen and solvent together with the liberated gas is produced to the surface of the earth. This will enlarge the permeability zone; however, repetitive treatments are usually required to achieve the desired extent of enlargement to form a stable communication path. Recovery of bituminous petroleum by more conventional, high efficiency techniques such as steam injection, steam emulsification drive, combined thermal-solvent, or in situ combustion operations may be undertaken using the communication path.

BRIEF DESCRIPTION OF THE DRAWINGS

The attached drawing presents an illustrative embodiment of our invention, wherein an injection well and production well are treated to produce the desired communication path according to the process of our invention.

DESCRIPTION OF THE PREFERRED EMBODIMENTS

I. The Process

Our invention may best be understood by reference to the attached drawing, which shows in cross-sectional view, a tar sand type of petroleum formation being subjected to one illustrative embodiment of the process of our invention. In the drawing, tar sand formation 1 is penetrated by wells 2 and 3, which are in fluid communication with the tar sand deposit 1 by means such as perforations 4 and 5 respectively. Wells 2 and 3 are both equipped on the surface for injection of fluid thereinto or production of fluid from the well. This is accomplished by providing well 2 with valves 6 and 7, and by providing well 3 with valves 8 and 9.

Hydraulic fracturing is performed in the formation via both wells, which gives rise to the creation of small, high permeability streaks penetrating a short distance into the formation, which are designated in the drawing as $T_0$ and $T_1$. Even though propping material is injected into the hydraulic fractures, the fractures are not adequate for sustained injection thereinto of steam in the final recovery phase of the operation because of the tendency for tar to flow down into the fracture zone. Accordingly, valve 7 is closed and valve 6 is opened, and solvent is injected into well 2 through perforation 4 into the propped fracture zone $T_0$. Gas is contained under pressure in vessel 10 which may be supplied from a compressor, and pumped therefrom by pump 11 into mixing vessel 12. Solvent is initially supplied from makeup tank 13 by a line 14 into mixing tank 12, and the pressure is raised to the desired pressure and sufficient mixing energy is supplied to insure that a substantial amount of gas dissolves in the solvent, or preferably that the solvent is saturated with respect to the gas at the desired injection pressure. It is not essential that the solvent be saturated with gas; however, superior results are usually obtained when the solvent contains the maximum concentration of gas dissolved therein. Excess, undissolved gas may also be present in the fluid. The term "gas-saturated solvent" should be construed in this specification to mean solvent having a substantial amount of gas dissolved therein, whether slightly less than saturation or slightly in excess of saturation. The gas-saturated solvent is then pumped via pump 15 through valve 6 into well 2 and into the propped fracture zone $T_0$. While the high pressure gas-saturated solvent is present in fracture zone $T_0$, the portion of the tar sand deposit surrounding this zone is contacted by the gas-saturated solvent. Solvent dissolves or imbibes into the bitumen in the tar sand deposit. As the gas saturated solvent moves away from the injection point, pressure declines and gas breaks out of solution and carries vaporized solvent with it according to Dalton's Law. Vapor phase components are more mobile and so can penetrate into the tar sand materials more effectively than liquid. The extent of movement of solvent into the tar sand deposit is readily ascertained on the surface by monitoring the injection pressure. As the solvent approaches equilibrium with the exposed surface of the tar sand material, the injection pressure stabilizes. The injection process is continued until the desired end point pressure is achieved, indicating that the maximum contact between injected solvent and tar sand material by the imbibition process has been achieved. A soak period of from 1 to 24 hours increases the amount of bitumen contacted, although this is not absolutely essential. Once this pressure has been reached and it appears to be stable, valve 6 is closed and continued injection of solvent is terminated. Valve 7 is opened, and the well is allowed to produce by solution gas drive. Gas dissolved in the solvent which has migrated into the tar sand deposit expands and breaks out of solution once the pressure begins to decline, forcing solvent with bitumen dissolved therein to flow into the fracture zone $T_0$, and then into the production well where it flows to the surface of the earth. In order to conserve solvent, the produced fluid may be directed to separation vessel 16, for separation of solvent from the produced bitumen. Separation in this instance is accomplished by connecting the suction of compressor 17 to the top of separation vessel 16, valve 18 being opened. The drop in pressure contained within vessel 16 results in rapid distillation-separation of the solvent from the produced bituminous petroleum. The solvent vapor is compressed in compressor 17 and flows into condenser 19 where it is recondensed into a liquid. Liquid solvent is pumped by a pump 20 into mixing vessel 12, for subsequent cycles of saturation with gas and reinjection into the well. Production of bitumen and solvent by solution gas drive is continued until the pressure is depleted and no additional bitumen-solvent extract is being obtained. This first step will have enlarged the flow channel or cavity considerably over the volume originally obtained by hydraulic fracturing and propping. Whether or not communication with adjacent well 3 has been established, additional cycles are usually desirable to increase the lateral extent of penetration and thickness of the zone.

Hydraulic fracturing will usually have been undertaken in well 3 simultaneously with fracturing in well 2, and as a consequence thereof propped fracture zone $T_1$ will have been established, extending a short distance into the formation. Gas and solvent will be mixed in vessel 12 and passed via line 21 through open valve 8 and into well 3 to repeat the process described above, until the desired injection pressure has stabilized in the formation. At this point injection will be terminated, valve 8 will be closed and valve 9 will be opened to permit production of the solvent-bitumen solution by solution gas drive to enlarge propped fracture zone $T_1$ to a substantially greater value $T_3$. Again the solvent-bitumen extract is produced and separated in a separation vessel 16a, for reuse of the solvent.

The above cycles are continued through a series of separate steps, simultaneously in each well or alternating from one well to the other, until a satisfactory permeable flow path between well 2 and well 3 is achieved.

The communication path between wells 2 and 3 established according to the above procedure may be utilized for a subsequent in situ recovery process such as steam injection, steam plus emulsifying chemical injection, or numerous other recovery techniques applicable to tar sand deposits which required the establishment of an interwell communication path. Although steam injected into well 2 will channel through the communication path, heating of the bituminous petroleum contained in the tar sand deposit occurs along the surfaces exposed to the communication path through which the heated fluid is being injected. Bituminous petroleum along the interface between the tar sand deposit and the communication path will be heated, the viscosity will be reduced, and the material will flow into the communication path. The bituminous petroleum will then flow toward the production well and will be produced along with steam condensate. The process is aided materially by including a small amount of a basic material such as caustic or sodium hydroxide in the steam, which enhances the formation of a low viscosity oil-in-water emulsion. The produced fluid in such a recovery program is a water-in-oil emulsion which has a viscosity only slightly greater than water. Surface equipment for separating bituminous petroleum from the oil-in-water emulsion must be provided.

A slightly different embodiment is sometimes possible in formations having appreciable gas permeability. A noncondensible gas, which may be the same gas which is dissolved in the solvent, is first injected into the formation until gas production is obtained from the production well. Gas saturated solvent is then injected into the formation. Injection of solvent into the formation is much easier following gas injection than if no gas is injected first, presumably because the creation of a gas saturated interval establishes a reduced permeability path for the subsequently injected liquid solvent. After gas injection and gas-saturated solvent injection has been completed, production of bitumen and solvent by solution gas drive proceeds as previously described. Repetitive cycles of injecting gas-saturated solvent and production of bitumen and solvent by solution gas drive are usually needed to develop a communication path of desired extent.

The communication path established according to the above described procedural steps may also be utilized in the refluxing solvent recovery process described in pending application Ser. No. 357,425, filed May 4, 1973.

II. The Solvent

Solvent choice for use in this invention is somewhat critical; not all materials capable of dissolving bitumen may be utilized effectively in the process of our invention since it is desirable that it be possible to dissolve a considerable amount of gas in the solvent. The suitability of a particular solvent will be influenced to a considerable extent by the nature of the gas available for use in combination therewith, and this factor should be a major consideration. Generally, monocyclic aromatic compounds including benzene, toluene, and xylene may be utilized effectively as a solvent in the process described above. Carbon disulfide is a very effective solvent, and certain gases are sufficiently soluble in carbon disulfide to permit its use in the process of our invention. Mixtures of aromatic hydrocarbon solvents and carbon disulfide are especially preferred solvents for use in our invention. Carbon tetrachloride and certain halogenated hydrocarbons which are essentially insoluble in and unreactive with water may also be utilized as a solvent in the process of our invention. Mixtures of any two or more materials described above may be used in our process.

III. The Gaseous Constituent

Gases suitable for use in combination with solvents in the process of our invention include carbon dioxide, methane, ethane, propane, and under certain circumstances, nitrogen and air. Generally the most favorable results are obtained when utilizing the gas having the highest solubility in the particular solvent being utilized. Carbon dioxide is an extremely desirable gas because of its high solubility in hydrocarbon material. Methane is also a preferred gas because of its solubility characteristics in most solvents suitable for use in the process of our invention. Ethane and/or propane may also be used. Nitrogen and air may also be utilized, although because of their lesser solubility in the preferred solvents, nitrogen and air are not as suitable for our process as are carbon dioxide and methane. Nevertheless, in localities where carbon dioxide or methane are not available, nitrogen or air may be utilized with attractive results. Mixtures of two or more of the above described gases may also be used.

As an example of the solubility of various gases in solvents, 630 standard cubic feet of carbon dioxide will dissolve in one barrel of carbon disulfide at 300 pounds per square inch 70°F. Similarly, 246 standard cubic feet of methane will dissolve in one barrel of carbon disulfide at 300 pounds per square inch and 70°F.

The especially preferred embodiments of our invention make use of aromatic hydrocarbons, carbon disulfide and mixtures thereof as the solvent, and carbon dioxide, methane and mixtures of carbon dioxide and methane as the gas.

IV. Field Example

Our invention may better be understood by reference to the following pilot field example, which is offered only as an illustrative embodiment of our invention, and is not intended to be limitative or restrictive thereof.

A tar sand deposit is located at a depth of 350 feet, and it is determined that the thickness of the tar sand deposit is 75 feet. An injection and a production well are drilled, 100 feet apart, and completed in the full interval of the tar sand deposit. Spinner surveys indicate that there are no intervals of high permeability within this particular segment of the tar sand deposit, and there is very low gas permability, so hydraulic fracturing must be undertaken in order to establish an injection zone for the process of our invention. Conventional hydraulic fracturing is applied to the formation adjacent to both the injection well and production well, and coarse sand propping material is injected into the fracture to prevent healing thereof after fracture pressure is removed. Gas injectivity tests are performed, and it is determined that communication between wells has not been achieved by fracturing, even though appreciable propped fracture zone volume has been created.

A mixture of carbon disulfide and toluene are chosen for the solvent, and carbon dioxide, readily available in the area at an attractive price, is utilized as the gas. Since the overburden thickness is 350 feet, the limiting pressure for this application is 350 pounds per square inch. A mixture of 50 percent carbon disulfide and 50 percent toluene is prepared in a pressurized mixing vessel and saturated with carbon dioxide at 325 pounds per square inch and 70°F, and this gas-saturated solvent mixture is injected into the injection well. Injection pressure slowly rises indicating a saturation condition is being achieved along the interfacial area between the propped fracture zone and the tar sand deposit. When the injection pressure reaches 325 pounds per square inch and stabilizes thereabouts, gas-saturated solvent injection is terminated and the well is allowed to produce by solution gas drive. Appreciable quantities of a bituminous petroleum-solvent extract are produced at first but production of this extract decreases after about 8 hours. Production of extract from the injection well is terminated, and gas-saturated solvent identical to that described above is injected into the production well until the injection pressure reaches 325 pounds per square inch. The contacted portion of the formation along the fracture zone adjacent to the production well is permitted to produce by solution-gas drive, until production of bituminous petroleum-solvent extract decreases. Injectivity tests indicate that well to well communication has still not been achieved, so gas-saturated solvent is again injected into the injection well until the 325 pounds per square inch injection pressure is reached and stabilized, after which solution gas drive production again is allowed to proceed. A similar treatment of the production well results in well to well communication, indicating an initial communication path has been established. One final treatment is undertaken, wherein gas-saturated solvent is injected into both the injection well and the production well simultaneously until the desired pressure is reached and stabilizes, followed by solution gas drive production from both wells. It is determined that a stable communication path has been created, and the formation may now be subjected to a steam-emulsification drive recovery process.

While our invention has been described in terms of a number of illustrative embodiments, it should be understood that it is not so limited, since many variations of the process of our invention will be apparent to persons skilled in the related art without departing from the true spirit and scope of our invention. Similarly, while a mechanism has been proposed to explain the benefits resulting from the process of our invention, we do not wish to be restricted to any particular mechanism responsible for the benefits achieved through the use of our process. It is our desire and intention that our invention be limited only by such restrictions and limitations as are imposed in the appended claims.

We claim:

1. In a method of recovering viscous petroleum including bitumen from a subterranean, viscous petroleum-containing formation including a tar sand deposit, said formation being penetrated by at least one injection well and by at least one production well, said method being of the type wherein a fluid is injected into the injection well for the purpose of increasing the mobility of the viscous petroleum contained in the formation, the improvement for creating a permeable, fluid communication path between the injection well and production well which comprises,
   a. fracturing the formation adjacent to at least one of the wells by hydraulic fracturing and injecting into the fractured zone a propping agent to establish a permeable, propped fracture zone extending at least a portion of the way into the tar sand deposit toward the other well;
   b. injecting into the propped fractured zone via the well adjacent thereto, a solvent for the formation petroleum selected from the group consisting of aromatic hydrocarbons, carbon tetrachloride, halogenated hydrocarbons which are essentially unreactive with and insoluble in water, carbon disulfide, and mixtures thereof, said solvent having dissolved therein a substantial amount of gas at a preselected pressure;
   c. terminating injection of the gas-containing solvent after the injection pressure has reached a preselected value; and
   d. reducing the pressure in the well adjacent to the propped fracture zone into which the gas-containing solvent has been injected, to permit the flow of solvent, petroleum and gas into the well and to the surface of the earth.

2. A method as recited in claim 1 wherein said solvent is saturated with respect to said gas.

3. A method as recited in claim 1 wherein repetitive cycles of injecting gas-containing solvent and permitting production thereof by solution gas drive are performed to enlarge the permeable propped fracture zone.

4. A method as recited in claim 3 wherein repetitive cycles are performed alternating between the injection well and the production well.

5. A method as recited in claim 3 wherein the repetitive cycles of injecting gas-containing solvent and production thereof by solution gas drive are continued until communication between wells is established.

6. A method as recited in claim 1 wherein gas-containing solvent is injected into injection and production wells simultaneously.

7. A method as recited in claim 1 wherein production of bitumen and gas-containing solvent by solution gas drive occurs simultaneously from the injection well and production well.

8. A method as recited in claim 1 wherein the pressure at which gas is dissolved in the solvent is equal to a value in the range from the pressure originally present in the formation to a value in pounds per square inch numerically equal to the thickness of the overburden above the formation measured in feet.

9. A method as recited in claim 1 wherein the pressure at which the gas-containing solvent is injected into the formation equal to a value between the original formation pressure and a value in pounds per square inch numerically equal to the thickness of the overburden in feet.

10. A method as recited in claim 1 wherein the solvent is carbon disulfide.

11. A method as recited in claim 1 wherein the aromatic hydrocarbons are selected from the group consisting of benzene, toluene, xylene, and mixtures thereof.

12. A method as recited in claim 1 wherein the aromatic hydrocarbon solvent is benzene.

13. A method as recited in claim 1 wherein the aromatic hydrocarbon solvent is toluene.

14. A method as recited in claim 1 wherein the aromatic hydrocarbon solvent is xylene.

15. A method as recited in claim 1 wherein the solvent is carbon tetrachloride.

16. A method as recited in claim 1 wherein the gas is selected from the group consisting of carbon dioxide, methane, ethane, propane, air, nitrogen, and mixtures thereof.

17. A method as recited in claim 16 wherein the gas is carbon dioxide.

18. A method as recited in claim 16 wherein the gas is methane.

19. A method as recited in claim 16 wherein the gas is a mixture of carbon dioxide and methane.

20. A method as recited in claim 16 wherein the gas is nitrogen.

21. A method as recited in claim 16 wherein the gas is air.

22. A method as recited in claim 1 wherein the recovery fluid injected into the communication path is steam.

23. A method as recited in claim 1 wherein the recovery fluid injected into the communication path is a mixture of steam and an alkaline material including sodium hydroxide.

24. In a method of recovering petroleum from subterranean viscous petroleum-containing formations including tar sand deposits, said formation being penetrated by at least one injection well and by at least one production well, both wells being in fluid communication with the subterranean petroleum-containing formation, of the type wherein a recovery fluid is introduced into the formation for the purpose of increasing the mobility of the petroleum, said formation containing at least one zone having a permeability substantially greater than the balance of the subterranean petroleum-containing formation, comprising;

a. identifying the high permeability zone of the subterranean petroleum-containing formation;
 b. injecting into the high permeability zone a solvent for the petroleum contained in the formation, selected from the group consisting of moncyclic aromatic compounds including benzene, toluene and xylene, carbon tetrachloride, halogenated hydrocarbons which are essentially unreactive with and insoluble in water, carbon disulfide and mixtures thereof, said solvent having dissolved therein a substantial amount of a gaseous material;
 c. stopping injecting of the gas-containing solvent when the injection pressure has reached a predetermined value; and
 d. permitting production by solution gas drive of the petroleum contacted by the gas-containing solvent.

25. A method as recited in claim 24 wherein said gaseous material is selected from the group consisting of methane, ethane, carbon dioxide, nitrogen, air and mixtures thereof.

26. In a method for recovering viscous petroleum including bitumen from viscous petroleum containing formations including tar sand deposits, of the type wherein a recovery fluid is introduced into the formation to increase the mobility of the petroleum, said formation being penetrated by at least one injection well and by at least one production well, said formation having sufficient gas permeability to permit passing gas through the formation from the injection well to the production well, the improvement for creating a communication path within the formation for passing the recovery fluid from the injection well to the production well which comprises:

a. passing a gas selected from the group consisting of carbon dioxide, methane, ethane, propane, nitrogen, air, and mixtures thereof from one of the wells to another well through the formation;
 b. thereafter introducing a solvent selected from the group consisting of benzene, toluene, xylene, carbon disulfide, carbon tetrachloride and mixtures thereof into the formation, said solvent having dissolved therein an appreciable amount of a gas selected from the group consisting of carbon dioxide, methane, ethane, propane, air, nitrogen and mixtures thereof; and
 c. reducing the pressure on at least one of the wells to permit flow from the formation via said well of solvent with formation petroleum dissolved therein.

27. A method as recited in claim 26 wherein said solvent is saturated with respect to said gas.

* * * * *